United States Patent [19]

Jilla

[11] 4,050,892

[45] Sept. 27, 1977

[54] COLORING POLYESTER MATERIALS WITH ACID DYES

[75] Inventor: Dara Ardeshir Jilla, Collinsville, Va.

[73] Assignee: Martin Processing Co., Inc., Martinsville, Va.

[21] Appl. No.: 396,805

[22] Filed: Sept. 13, 1973

[51] Int. Cl.$^2$ .............................................. D06P 3/00
[52] U.S. Cl. ............................................. 8/4; 8/30; 8/31; 8/168 C; 260/37 NP; 260/37 P; 260/40 R; 264/290 T
[58] Field of Search .......................... 8/4, 31, 168, 30; 264/290 T; 260/40 R

[56] References Cited

U.S. PATENT DOCUMENTS

| | | | |
|---|---|---|---|
| 3,102,323 | 9/1963 | Adams | 8/DIG. 4 |
| 3,117,173 | 1/1964 | Adams | 264/290 T |
| 3,233,019 | 2/1966 | Adams | 264/290 T |
| 3,317,978 | 5/1967 | McIntosh et al. | 264/168 |
| 3,472,608 | 10/1969 | Kingston | 8/100 |
| 3,527,846 | 9/1970 | Cappuccio et al. | 8/31 |
| 3,807,946 | 4/1974 | Harper et al. | 8/31 |

FOREIGN PATENT DOCUMENTS

| | | | |
|---|---|---|---|
| 1,060,623 | 3/1967 | United Kingdom | 8/172 |
| 760,041 | 10/1956 | United Kingdom | 8/172 |

*Primary Examiner*—Donald Levy
*Attorney, Agent, or Firm*—Stevens, Davis, Miller & Mosher

[57] ABSTRACT

A process is disclosed for preparing shaped or preformed polyester material for coloring with acid type dyes, which comprises impregnating the shaped or preformed polyester material, preferably but not necessarily continuously, at a temperature between 90° C. and 250° C. at ordinary atmospheric pressure with a mixture of (a) an organic nitrogen compound and (b) a glycol, an alcohol, a ketone, an ether, or water; then cooling the treated material with cold water or a mixture of a carboxylic acid with cold water whereby to impart affinity for acid dyes to the treated polyester material. Coloring the treated polyester material is then effected such as by padding, printing or cascading the treated polyester material with an acid dye from an aqueous solution or a printing paste whereby to effect fixation of said acid dye on the treated polyester material with substantially uniform distribution thereof within the polyester material. The organic nitrogen compound is an alkyleneamine, an alkanolamine, or an alkylamine. The pretreated polyester material to which affinity for acid type dyes has been imparted is also claimed as a part of the invention, as is the thus acid-dyed pretreated polyester material.

14 Claims, No Drawings

COLORING POLYESTER MATERIALS WITH ACID DYES

This invention relates broadly to the coloring of polyester materials with acid type dyes. The polyester materials, may be in various forms, such as film; fiber; multifilament continuous filament or staple fiber yarn; woven, non-woven, knitted, tufted, needle-punched or laminated fabric; and the shaped articles produced therefrom.

Polyester materials are mainly dyed with disperse and azoic dye combinations and certain vat dyes, as more fully described on pages 21–267 of The Dyeing of Polyester Fibers, Imperial Chemical Industries Limited, Third Edition, November 1964, published by Raithby, Lawrence and Company, Great Britain. Also, modified polyesters are dyeable with basic type dyes, as more fully described and claimed in the Griffing et al. U.S. Pat. No. 3,018,272. However, mere staining of polyester materials is obtained with other well known classes of dyes, such as direct, reactive, acid, chrome and sulphur dyes. These stains are almost always restricted to surface coloration, and possess poor fastness properties.

It is an object of this invention to provide a process for pre-treating shaped or preformed polyester materials preparatory to coloring same with acid type dyes whereby to produce strong, very bright, uniform dyeings, well penetrated into the substrate. It is a further object of this invention to provide a process as aforesaid, which is especially well adapted for continuous dyeing; that is, the dyeing of the pre-treated polyester materials with acid dyes on a continuous roll by such methods as padding, printing or cascading. Yet another object is to provide a shaped article produced from polyester material modified or pretreated as described hereinafter, the said polyester article having a remarkable affinity for acid type dyes. Additional important objects and features of this invention will appear more fully as the description proceeds.

My process consists essentially in first treating the shaped or preformed polyester material under relaxed or relatively untensioned condition with a mixture of organic nitrogen compounds in varying concentrations with glycols, alcohols, ketones, ethers, or water at a temperature of between 90° C. and 250° C. at ordinary atmospheric pressure for a brief interval of time, usually less than about 1 minute, and more often of the order of about 10 to 20 seconds or even merely about 5 seconds, and then chilling or flash-cooling the treated material by contact with cold water or a mixture of a carboxylic acid with cold water, and then drying.

The chilling step when cold water alone is used completes the chemical reaction while at the same time effecting substantially complete removal of the residual organic nitrogen compound from the treated polyester material. If desired, the organic nitrogen compound may be recovered if economically feasible, or if not desired the wash liquor may simply be run to the sewer. When cold water in conjunction with a carboxylic acid is used for chilling, it appears that the carboxylic acid reacts with the amine groups of the substrate to form amide groups to an extent depending upon the acid content and the degree of penetration and saturation of the substrate by the cold water-acid mixture.

I have discovered that this treatment or pre-treatment in some manner causes the polyester material to acquire a remarkable affinity for acid type dyes. Very strong and bright coloration is produced when the thus pretreated polyester material is then impregnated with an aqueous solution or a printing paste of acid dyes on a continuous roll by such per se well known methods as padding, printing or cascading followed if desired by per se well known methods of fixation of the color by steam or dry heat (required only for certain forms of polyester materials), rinsing and then drying, as more fully described on pages 45 and 53 of Modern Textiles, Vol. LIV, No. 3, March 1973; and in Gibson Pat. No. 2,663,612. It may be noted in this connection that films generally have a very low surface-to-weight ratio as compared to fibers. Accordingly, steam or dry heat is not required for fixation of the color when polyester films are treated and then dyed with aqueous solutions of acid dyes according to my invention. Steam or dry heat is preferred for bringing about maximum fixation of the color when polyester fibers are treated and dyed according to my invention.

Examples of preferred organic nitrogen compounds include alkyleneamines, alkanolamines and alkylamines, such as diethylenetriamine, triethylenetetramine, tetraethylenepentamine, hexamethylenediamine, hexamethylenetetramine, mono-, di- and tri- ethanolamine, triethylamine, di- and tripropylamine, and di- and tributylamine.

Preferred gylcols include ethylene glycol, di-, tri- and tetraethylene glycol, and polypropylene glycol.

Suitable alcohols are for example isopropanol and butanol.

Suitable ketones are for example acetone and methyl ethyl ketone.

Suitable ethers are for example isopropyl ether and butyl ether.

Suitable carboxylic acids are for example oxalic acid, sebacic acid, citric acid and adipic acid.

Other methods of applying the principles of this invention may be employed instead of those specifically mentioned inasmuch as it will be apparent that obvious modification thereof may be made within the skill of the art without departing from the spirit of the invention and the scope of the appended claims. Without limiting my invention, therefore, the following examples are given in order still better to illustrate the details of operation. Unless otherwise indicated, parts mentioned are by volume.

These examples include actual runs made in the laboratory to test the chemical validity of the process. Because of the laboratory scale of the test, the experiments were done on a relatively limited quantity of polyester film, yarn and fabric using a batch process. The convertibility of the process in each instance into continuous operation on a plant scale (using conventional apparatus appropriate for plant scale operation) is perfectly obvious from the short period of time required for the pretreatment of the polyester material to impart excellent affinity for acid dyes.

EXAMPLE 1

20 parts of commercial tetraethylenepentamine and 80 parts of commercial tetraethylene glycol are placed in a vessel fitted with stirring gear and then the temperature is increased to 197° C. at atmospheric pressure.

A strip of polyethylene terephthalate film, 2 mils in thickness, was then treated with the above mixture for 5 seconds in the usual manner (i.e., by feeding the film through the treatment bath and then through squeeze rolls), then chilled by contact with cold water and dried. The high-temperature treatment with the mixture of tetraethylenepentamine and tetraethylene glycol and the subsequent chilling step in cold water imparted the desired permanent affinity for acid dyes to the treated polyester material.

1 gram of Merpacyl Blue SW (C.I. 25), an acid dye of the anthraquinone type, 200 cc. of water and 0.2 cc. of concentrated sulphuric acid were stirred together at 99° C. until the dye was completely dissolved. The polyethylene terephthalate film, pretreated as just described, was then treated with the above dye solution for 30 seconds. The film was then rinsed to remove any residual, loosely adhering, superficial dye particles and dried. A deep, bright blue shade was obtained. Steam or dry heat is not required for color fixation.

A control sample of polyethylene terephthalate film, 2 mils in thickness, is prepared following the above procedure, except that the film was not pre-treated with the mixture of tetraethylenepentamine and tetraethylene glycol. When dyed with Merpacyl Blue SW dye under the conditions used above, the control film adsorbs virtually none of the dye, and what little color appears is removed easily by washing.

In a similar manner, uniform, bright and strong dyeings of shades as indicated below were obtained on polyethylene terephthalate film, pretreated as just described, with the following dyes:

| DYE EMPLOYED | SHADE OBTAINED |
| --- | --- |
| Merpacyl Red B, C.I. Acid Red 266 | Red |
| Merpacyl Orange R, C.I. Acid Orange 128 | Bright Orange |
| Merpacyl Yellow 4G, C.I. Acid Yellow 174 | Bright Yellow |
| Merpacyl Blue 2GA, C.I. Acid Blue 40 | Blue |

EXAMPLE 2

A mixture containing 80 parts of commercial hexamethylenediamine, boiling point 204° C., and 20 parts of commercial tetraethylene glycol was prepared as in Example 1 and the temperature was increased to 197° C. at atmospheric pressure.

Using the procedure described in Example 1, a strip of polyethylene terephthalate film, 2 mils in thickness, was then treated with the above mixture for 5 seconds, and then chilled by contact with a mixture of 4 grams of adipic acid in 200 cc. cold water, and then dried.

A dye solution containing 1 gram of Telon Fast Violet EF (C.I. 103), an acid dye of the anthraquinone type, 200 cc. of water and 0.2 cc. of concentrated sulphuric acid was prepared as in Example 1. The polyethylene terephthalate film, pre-treated as just described, was then treated with the above dye solution at 99° C. for 60 seconds, rinsed and then dried. The film is dyed a very bright shade of violet. Here again, steam or dry heat is not required for color fixation.

A control sample of polyethylene terephthalate film, 2 mils in thickness, prepared without the initial treatment with the mixture of hexamethylenediamine and tetraethylene glycol according to this invention, adsorbs virtually none of the dye.

Other dyes giving equally good results by the same procedure as that just described were:

| DYE EMPLOYED | SHADE OBTAINED |
| --- | --- |
| Merpacyl Blue SW, C.I. Acid Blue 25 | Bright Blue |
| Merpacyl Blue 2GA, C.I. Acid Blue 40 | Blue |
| Nylomine Acid Green C-3G, C.I. Acid Green 40 | Bright Green |
| Anthralan Violet 3B, C.I. Acid Violet 43 | Violet |

EXAMPLE 3

A mixture of 90 parts of commercial triethylenetetramine, boiling point 276° C., and 10 parts of commercial triethylene glycol, boiling point 288° C., was prepared as in Example 1 and the temperature was increased to 210° C. at atmospheric pressure.

Using the procedure above in Example 1, a skein of polyethylene terephthalate staple fiber yarn, 2.25 cotton count and 2 ply, was then treated with the above mixture for 10 seconds, and then flash-cooled by contact with a mixture of 4 grams of adipic acid in 200 cc. of cold water, and then dried.

A dye solution containing 1 gram of Merpacyl Blue 2GA (C.I. 40), an acid dye of the anthraquinone type, 200 cc. of water and 0.2 cc. of concentrated sulphuric acid was prepared as in Example 1. The polyethylene terephthalate yarn, pre-treated as just described, was impregnated with the above dye solution at 65° C. by printing, steamed at 100° C. for 3 minutes for color fixation, rinsed, and then dried. The yarn is dyed a bright shade of blue.

A control sample of polyethylene terephthalate staple fiber yarn prepared without the initial treatment with the mixture of triethylenetetramine and triethylene glycol according to this invention adsorbs virtually none of the dye even after prolonged steaming.

Other dyes giving equally good results by the same procedure were:

| DYE EMPLOYED | SHADE OBTAINED |
| --- | --- |
| Levelan Red 3B, C.I. Acid Red 80 | Red |
| Telon Fast Violet EF, C.I. Acid Violet 103 | Bright Violet |
| Nylomine Acid Green C-3G, C.I. Acid Green 40 | Bright Green |
| Merpacyl Blue SW, C.I. Acid Blue 25 | Bright Blue |
| Chinoline Yellow O, C.I. Acid Yellow 3 | Bright Yellow |

The treatment of polyethylene terephthalate staple fiber yarn with the mixture of commercial triethylenetetramine and commercial triethylene glycol as described above, is repeated, following which the yarn is flash-cooled by contact with cold water and then dried. The thus pre-treated yarn is then impregnated by printing with an aqueous solution of 1 gram of Du Pont Anthraquinone Green GNN(C.I. 25), an acid dye of the anthraquinone type, 200 cc. of water and 0.2 cc. of sulphuric acid, steamed at 100° C. for 3 minutes, rinsed, and then dried. The yarn is dyed a deep shade of olive-green, whereas a control sample of untreated polyethylene terephthalate yarn adsorbs virtually none of the dye.

EXAMPLE 4 - PRINTING

A mixture of 60 parts of commercial hexamethylenediamine, boiling point 204° C., and 40 parts of commercial tetraethylene glycol was prepared as described in Example 2 and the temperature was increased to 205° C. at atmospheric pressure.

Using the procedure described above in Example 2, a strip of polyethylene terephthalate fabric was then treated with the above mixture for 10 seconds, and then flash-cooled by contact with a mixture of 4 grams of adipic acid in 200 cc. of cold water, and then dried.

A paste containing the following was prepared:

| | |
|---|---|
| Du Pont Anthraquinone Green GNN (C.I. 25) | 1 gram |
| Water | 200 cc. |
| Sulphuric acid (concentrated) | 0.2 cc. |
| Polygum 560 (a commercial thickener or printing gum) | 0.6 gram |

The pre-treated polyethylene terephthalate fabric was printed with this paste and dried. It was then passed continuously through a flue drier maintained at 204° C., the rate of feed being regulated to give an exposure time of 60 seconds. The fabric was then rinsed and dried. A medium olive-green shade was obtained.

In contrast, printing attempted with a similar printing paste of this color but without the initial treatment with the mixture of hexamethylenediamine and tetraethyleneglycol according to this invention produced essentially no coloration even after prolonged heating.

EXAMPLE 5

A mixture of 90 parts of commercial diethanolamine, boiling point 268° C., and 10 parts of commercial diethylene glycol, boiling point 245° C., was prepared as in Example 3 and the temperature was increased to 245° C. at atmospheric pressure.

Using the procedure described above in Example 3, a skein of polyethylene terephthalate staple fiber yarn was then treated with the above mixture for 10 seconds, and then chilled by contact with a mixture of 4 grams of adipic acid in 200 cc. of cold water, and then dried.

A dye solution containing 1 gram of Anthralan Violet 3B (C.I. 43), an acid dye of the anthraquinone type, 200 cc. of water and 0.2 cc of concentrated sulphuric acid was prepared as in Example 3. The polyethylene terephthalate yarn, pre-treated as described above, was then treated with the above dye solution at 99° C. for 60 seconds, rinsed, and then dried. The yarn dyed to a medium shade of violet.

It is important to note that, as shown by this example, steam or dry heat is not essential for color fixation with this method of dyeing even when the polyester material is in other than film form.

A control sample of polyethylene terephthalate yarn prepared and treated similarly but without the initial treatment with the mixture of diethanolamine and diethylene glycol according to this invention produced essentially no coloration.

EXAMPLE 6 - MIXED DYES

A mixture of 60 parts of commercial hexamethylenediamine, boiling point 204° C., and 40 parts of commercial tetraethylene glycol was prepared as described above in Example 4 and the temperature was increased to 205° C. at atmospheric pressure.

Using the procedure described above in Example 4, a skein of polyethylene terephthalate staple fiber yarn was then treated with the above mixture for 5 seconds, and then flash-cooled by contact with a mixture of 4 grams of adipic acid in 200 cc. of cold water and then dried.

A mixed dye solution containing the following was prepared:

| | |
|---|---|
| Merpacyl Orange R, C.I. Acid Orange 128 | 0.25 gram |
| Merpacyl Blue SW, C.I. Acid Blue 40 | 0.25 gram |
| Merpacyl Red B, C.I. Acid Red 266 | 0.01 gram |
| Water | 200 cc. |
| Sulphuric acid (concentrated) | 0.2 cc. |

The polyethylene terephthalate yarn, pre-treated in the manner described, is then treated with the above mixed solution at 99° C. for 60 seconds, rinsed, and then dried. The yarn dyed a deep shade of olive-brown. Again, steam or dry heat is shown not to be essential for color fixation with this method of dyeing.

In contrast, dyeings prepared in an otherwise similar manner and with a similar mixed dye solution, but without the initial treatment with the mixture of hexamethylenediamine and tetraethylene glycol according to this invention, produced essentially no coloration.

It will be clear from the above examples that my invention is applicable to a wide variety of polyester materials. Films, filaments, yarns and fabrics are the preferred structures for use in the present invention. These polyester materials treated according to my invention possess a remarkably strong affinity for acid dyes, which on subsequent treatment with aqueous solutions of acid dyes produces commercially important, very bright, strong coloration suitable for the usual textile applications. A complete range of hues can be obtained, many of them being very bright.

These polyester materials may be employed in the knitting, weaving or tufting of fabrics of all types as well as in the production of carpets and non-woven felt-like products produced by the known methods.

By an "acid dye" is meant a colored anionic organic substance such as those containing azo, anthraquinone, quinoline, triphenylmethane, azine, xanthene, ketonimine, nitro or nitroso compounds. Among the acid dyes which may be applied to the polyester materials in accordance with the present invention may be mentioned Merpacyl Blue SW(C.I. 25); Merpacyl Blue 2GA(C.I. 40); Telon Fast Violet EF(C.I. 103); Nylomine Acid Green C-3G(C.I. 40); Chinoline Yellow O(C.I. 3); Levelan Red 3B(C.I. 80); and the like. The acid dyes are preferably applied from an aqueous solution at a temperature between about 50° C. and 125° C.

If desired, the impregnation with the solution of acid dyes may be followed by per se known methods of fixation of the color by steam or dry heat.

If desired, the aqueous dye solutions may be rendered strongly acidic in conventional manner such as by the addition of an appropriate amount of an acid such as sulfuric acid or formic acid. Other dyebath additives, such as thickeners, foaming agents, wetting agents, levelling agents, retarders or buffers may also be present.

When reference is made in the subjoined claims to an acid dye, it will be understood that mixtures of different acid dyes are contemplated as being within the invention.

I do not wish to be limited to the treatment of any particular kind of polyester material, especially since polyester materials are old and well known and per se form no part of the present invention. Consequently, I consider it sufficient for background disclosure purposes to refer broadly to the following literature source for further information on these per se old materials: Mark-Gaylord's Encyclopedia of Polymer Technology, Vol. 11, 1969, pages 1–128. The polyethylene terephthalate specifically mentioned above by way of example is of course a well-known kind of commercially available polyester material.

What is claimed is:

1. A process for pretreating a material consisting essentially of polyester to impart thereto affinity for acid dyes, which comprises pretreating the polyester material for a brief time less than about one minute at a temperature between 90° C and 250° C and at ordinary atmospheric pressure with a mixture of (a) an organic nitrogen compound selected from the group consisting of diethylenetriamine, triethylenetetramine, tetraethylenepentamine, hexamethylenediamine, hexamethylenetetramine, mono-, di- and triethanolamine, triethylamine, di- and tripropylamine, and di- and tributylamine, and (b) a glycol selected from the group consisting of ethylene glycol, di-, tri- and tetraethylene glycol, and polypropylene glycol, and then subjecting the polyester material to contact with cold water or a mixture of cold water and a carboxylic acid selected from the group consisting of oxalic acid, sebacic acid, citric acid, and adipic acid sufficient to chill the polyester material, thereby imparting to the thus-pretreated polyester material an affinity for acid dyes.

2. A material consisting essentially of polyester modified by pre-treatment at a relatively elevated temperature with a mixture of (a) an organic nitrogen compound selected from the group consisting of diethylenetriamine, triethylenetetramine, tetraethylenepentamine, hexamethylenediamine, hexamethylenetetramine, mono-, di- and triethanolamine, triethylamine, di- and tripropylamine, and di- and tributylamine, and (b) a glycol selected from the group consisting of ethylene glycol, di-, tri- and tetraethylene glycol, and polypropylene glycol, and thereafter chilled by contact with cold water or a mixture of cold water and a carboxylic acid selected from the group consisting of oxalic acid, sebacic acid, citric acid, and adipic acid, the thus pretreated polyester material possessing a strong affinity for acid dyes.

3. A process for coloring a material consisting essentially of polyester with acid dyes, which comprises pre-treating the polyester material for a brief time less than about one minute at a temperature between 90° C and 250° C and at ordinary atmospheric pressure with a mixture of (a) an organic nitrogen compound selected from the group consisting of diethylenetriamine, triethylenetetramine, tetraethylenepentamine, hexamethylenediamine, hexamethylenetetramine, mono-, di- and triethanolamine, triethylamine, di- and tripropylamine, and di- and tributylamine, and (b) a glycol selected from the group consisting of ethylene glycol, di-, tri- and tetraethylene glycol, and polypropylene glycol, chilling the polyester material with cold water or a mixture of cold water and a carboxylic acid selected from the group consisting of oxalic acid, sebacic acid, citric acid, and adipic acid sufficiently to chill the polyester material, thereby imparting to the thus pre-treated polyester material an affinity for acid dyes; and then coloring the thus pre-treated polyester material by padding, printing or cascading an acid dye from an aqueous solution or printing paste and thereby effecting fixation of said acid dye on the thus pre-treated polyester material with uniform distribution thereof within the polyester material.

4. A process as defined in claim 1, wherein the treatment with the organic nitrogen compound-containing mixture is carried out continuously.

5. A process as defined in claim 3, wherein both the treatment of the polyester material with the organic nitrogen compound-containing mixture and the coloring with the acid dye are carried out continuously.

6. An acid-dyed material consisting essentially of acid-dyed polyester that has been first modified by treatment at a relatively elevated temperature with a mixture of (a) an organic nitrogen compound selected from the group consisting of diethylenetriamine, triethylenetetramine, tetraethylenepentamine, hexamethylenediamine, hexamethylenetetramine, mono-, di- and triethanolamine, triethylamine, di- and tri-propylamine, and di- and tributylamine, and (b) a glycol selected from the group consisting of ethylene glycol, di-, tri- and tetraethylene glycol, and polypropylene glycol, and thereafter chilled by contact with cold water or a mixture of cold water and a carboxylic acid selected from the group consisting of oxalic acid, sebacic acid, citric acid, and adipic acid.

7. The polyester material of claim 2, wherein the polyester material is in the form of a film.

8. The polyester of claim 2, wherein the polyester material is in the form of a fiber or filament.

9. The polyester of claim 2, wherein the polyester material is in the form of a multi-filament continuous filament or staple fiber yarn.

10. The polyester of claim 2, wherein the polyester material is in the form of a woven, non-woven, knitted, tufted, needle-punched or laminated fabric.

11. The acid-dyed polyester material of claim 6, wherein the polyester material is in the form of a film.

12. The acid-dyed polyester material of claim 6, wherein the polyester material is in the form of a fiber or filament.

13. The acid-dyed polyester of claim 6, wherein the polyester material is in the form of a multi-filament continuous filament or staple fiber yarn.

14. The acid-dyed polyester of claim 6, wherein the polyester is in the form of a woven, non-woven, knitted, tufted, needle-punched or laminated fabric.

* * * * *